Dec. 11, 1923.  
W. J. HAGMAN  
LEVER LOCKING DEVICE FOR HYDRAULIC MACHINES  
Filed Jan. 12, 1921  
1,477,171
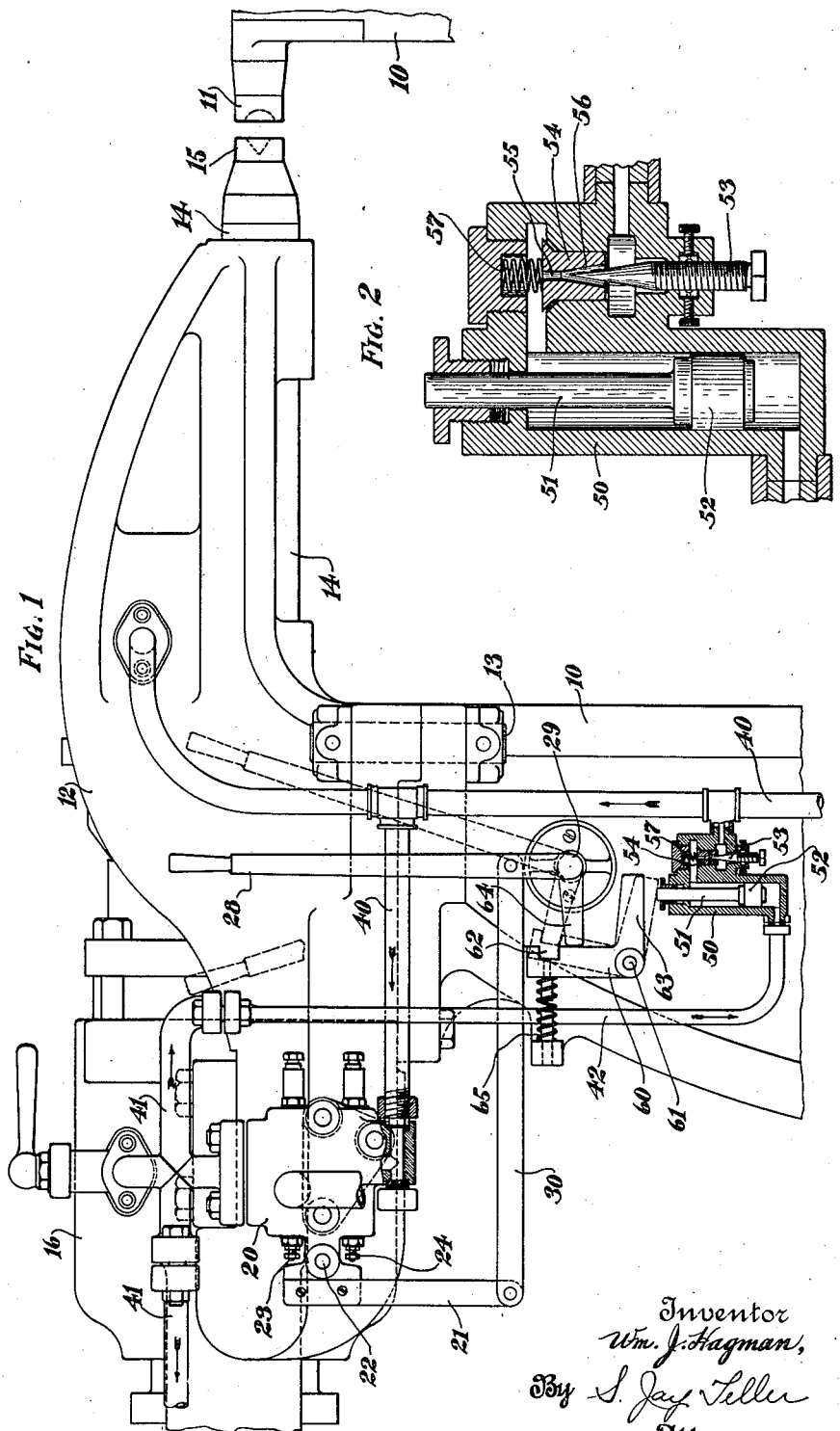

Patented Dec. 11, 1923.

1,477,171

UNITED STATES PATENT OFFICE.

WILLIAM J. HAGMAN, OF PHILADELPHIA, PENNSYLVANIA, ASSIGNOR TO NILES-BEMENT-POND COMPANY, OF NEW YORK, N. Y., A CORPORATION OF NEW JERSEY.

LEVER-LOCKING DEVICE FOR HYDRAULIC MACHINES.

Application filed January 12, 1921. Serial No. 436,819.

*To all whom it may concern:*

Be it known that I, WILLIAM J. HAGMAN, a citizen of the United States, residing at Philadelphia, in the county of Philadelphia and State of Pennsylvania, have invented certain new and useful Improvements in Lever-Locking Devices for Hydraulic Machines, of which the following is a specification.

This invention relates to hydraulic machines such as hydraulic riveters and other similar machines.

The object of the present invention is to provide a device to hold the plunger or movable element of a hydraulic machine in one of its operative positions for a predetermined length of time, as, for instance, to hold a rivet set or die in its position against a rivet for a sufficiently long time for the rivet to cool and set.

More particularly, an object of my invention is to provide a spring actuated holding means for the plunger of a hydraulic riveter, so that after the hydraulic plunger has been forced forward to cause the rivet set to engage and compress the rivet into its final shape, the plunger is held in its forward position and with its force exerted against the rivet until a predetermined time has elapsed. I preferably provide the spring actuated holding means in the form of a spring pressed latch which, as soon as the operating lever has been moved to its forward position, engages an extension to this lever and prevents reverse movement of the lever. During the time this holding means is operating it is therefore impossible for the operator to withdraw the plunger or to open the release valve which would permit the pressure against the plunger to be reduced. As soon as a predetermined time has elapsed, which time may preferably be materially varied, the operating lever of the hydraulic riveter is released by movement of the holding means to inoperative position so that the operator can withdraw the plunger from the rivet and again utilize the plunger to force another rivet into place.

In riveting high pressure boilers, or other parts in which the rivets are submitted to very high shearing stresses, it is desirable, and, in fact, imperative that the rivet be held forcibly in engagement with the walls of the boiler, or other part in which the rivet is to be used, long enough for the rivet to become rigidly set. It is obvious that if the operator merely forced the rivet into its position and immediately withdrew the plunger while the rivet remained at a high temperature, the rivet would again expand and become loose in its position thus forming an imperfect and weakened joint. It is to avoid this defect and its attendant dangers that constitute the primary objects of this invention.

I accomplish these results by means of a simple and compact device attached to the riveter or other hydraulic machine which serves to lock the operating lever in one of its positions for a predetermined time. This prevents the operator from moving the operating lever to withdraw the plunger from the rivet for a predetermined time after the plunger is forced to its forward operative position so that the rivet is allowed ample time to set during which time the full force of the pressure against the plunger is exerted against the rivet. Preferably the device comprises a latch moved into engagement with a part on the operating lever which latch is withdrawn from engagement with the lever after a predetermined time by a fluid operated piston moving the latch to its inoperative position.

With these and other objects in view, my invention consists of the features of construction and operation set forth in the following specification.

In the accompanying drawings annexed hereto and forming a part of this specification, I have shown my invention embodied in a hydraulic riveting machine, but it will be understood that the invention can be otherwise embodied and that the drawings are not to be construed as defining or limiting the scope of the invention, the claims appended to this specification being relied upon for that purpose.

In the drawings:

Figure 1 shows a side elevation of the co-operating parts of a hydraulic riveter to which the present invention has been applied, and Fig. 2 is an enlarged view of the controller piston serving to release the operating lever.

Briefly, my invention in its broadest aspect comprises the following principal parts, namely: first, a hydraulic machine; second, a fluid operated plunger enclosed within the head of the machine; third, an operating lever adapted to control the fluid under high pressure to operate said plunger; fourth, a device, preferably a spring operated latch, that holds the operating lever in one of its operative positions; and fifth, a fluid operated means to release said latch after a predetermined variable time.

Referring more in detail to the figures of the drawing, at 10 is shown the frame of a hydraulic machine, the particular one illustrated being a hydraulic riveter, for which the invention is particularly adapted, the upper parts only of the two arms being shown. One of the arms supports a stationary die or rivet set 11 adapted to engage the head of a rivet.

On the upper surface of the other arm is mounted a head 12 preferably fastened securely to the arm 10 by means of bolts 13. Within the head 12 operates a plunger 14, at the forward end of which is a die or set 15 adapted to co-act with the stationary die 11 and also engage the opposite end of a rivet. On the head 12 is mounted a cylinder 16 within which a piston (not shown) operates to force the plunger 14 forward and rearward. As the plunger 14 and the cylinder 16 form well known parts of a standard riveting machine, further description or showing is thought to be unnecessary. Suffice it to say that when fluid, preferably a liquid under high pressure is admitted to either side of the piston within the cylinder 16, the plunger 14, which is directly fastened to this piston, is forced forward or rearward depending on which side of the piston the fluid is admitted.

Mounted on one side of the head 12 is a valve casing 20 in which are located valves to control the admission or exhaustion of fluid to operate the plunger 14 in either direction. These valves are operated by a lever 21 pivotally mounted on the valve casing 20 as shown at 22 and engaging valve stems 23 and 24 extending to the outside of casing 20.

To operate the valve controlling lever 21, an operating lever or handle 28 is provided pivotally mounted on the frame 10 as shown at 29. This handle 28 is connected to the valve lever 21 by means of a reach arm 30. Movement of the operating handle 28 to its forward position serves to position the valves within casing 20 to force the plunger 14 forward by means of fluid supplied under high pressure passing through conduits 40 and 41 to the cylinder 16. Movement of handle 28 to its rear position serves to move the plunger 14 backward.

In operating the riveter shown in the drawings, after the parts to be riveted are positioned between the dies or sets 11 and 15 and the rivet placed in position, the operating lever 28 is first moved to its forward position thus forcing the plunger 14 forward toward the stationary anvil or die 11. With movement of lever 28, which opens one of the valves within casing 20, fluid is admitted to within cylinder 16 through conduit 41. A conduit 42 forms an extension of conduit 41 and is thus supplied with fluid at the same time as conduit 41. Conduit 42 leads to the casing 50 within which is a piston 51. This piston 51 may be elevated within the cylinder formed in casing 50 by the fluid passing through the conduit 42 and takes place at the time during which fluid is supplied through conduit 41 to force the plunger 14 forward.

The upward movement of the plunger 51 within casing 50 is materially retarded by a needle valve 53 which serves to limit the outflow of fluid from above the plunger 51. Preferably, as shown in Fig. 1, the casing 50 is attached to the main supply conduit 40, the passage leading from the space above the plunger 51 being directly connected with this main supply conduit 40 so that the fluid passing the needle valve 53 has to be forced outward against the pressure within conduit 40. As the pressure within conduit 42, when the pressure is admitted to force the plunger 14 forward, is the same as that within the conduit 40, and, as the pressure within conduit 42 is exerted on the full diameter of the head 52 of the plunger 51, the total pressure on the plunger forcing it upward is greater than that forcing it downward, which force is exerted only on the annulus surrounding the stem of the plunger 51. The plunger 51 is therefore slowly elevated while the plunger 14 is held firmly against the rivet. To regulate the speed with which the plunger 51 may be elevated, it is only necessary to vary the adjustment of the needle valve 53.

A check valve 54 is also provided within the casing 50 so that when the pressure within the conduits 41 and 42 is released, the fluid within conduit 40 may rapidly enter the casing 50 by forcing the check valve 54 upward, thus lowering the plunger 51. As shown in the figures, the needle valve 53 is inserted in a position so that it is centrally mounted relative to the check valve 54, the check valve 54 being provided with a hole 55 extending through its center thus permitting fluid from the casing 50 to pass through the check valve 54 and into the conduit 40 as above described. The hole 55 extending through the check valve 54 is tapered as shown at 56 to conform with the taper on the needle valve 53, and thus forms a restricted passage for the fluid past the valve 53. Normally a light spring 57 presses against the upper surface of the check valve 54 and holds it in its closed position as shown in Fig. 1.

Adjacent the plunger 51 is a bell crank 60 pivotally mounted to the frame 10 about pivot 61. The vertical arm of the bell crank 60 is provided with a notch as shown at 62 and the lower or horizontal arm 63 of the bell crank 60 is extended to a position directly over the plunger 51. The operating lever 28 is provided with a short arm 64 which lies adjacent the upper arm of the bell crank 60 and a spring 65 normally holds the bell crank 60 in a position so that its vertical member presses against the arm or extension 64 of lever 28.

As soon as the lever 28 is moved to its forward position, the bell crank 60 is engaged with arm 64, the arm 64 engaging the notch 62 in bell crank 60 as shown in dotted lines in Fig. 1. With the bell crank 60 in this position, it is therefore impossible to move the lever 28 and thus the plunger 14 is held firmly in its forward operative position.

As soon as the pressure is supplied to conduits 41 and 42, the plunger 51 starts to rise as above described and, as soon as this plunger 51 has reached a position so that it forces the bell crank 60 into the position shown in full lines in Fig. 1, the operating lever 28 is released and may again be moved to its neutral or vertical position.

By adjusting the position of the needle valve 53, the period of time during which the plunger 51 is elevated sufficiently to release the lever 28 may be varied within very wide limits so that when it is desired to hold the plunger 14 in its forward operative position a longer time, it is only necessary to vary the time of elevating the plunger 51.

As soon as the lever 28 is drawn back to its neutral position, the fluid within conduits 41 and its extension 42 is released so that the piston is lowered by the pressure of the fluid passing from conduit 40 into the space above piston head 52. This permits the bell crank 60 to be again forced toward the right against the extension 64 of lever 28 so that the notch 62 may engage this extension as soon as the lever 28 is moved to its forward operative position.

What I claim is:

1. In a fluid operated machine, the combination of a frame, a cylinder thereon, a plunger in said cylinder, an operating lever controlling the admission of fluid to said cylinder to move said plunger, and pressure operated means associated with said lever and operated by the fluid supplied to the machine to hold said plunger in one of its operative positions for a predetermined time.

2. In a fluid operated machine, the combination of a frame, a cylinder thereon, a plunger in said cylinder, an operating lever controlling the admission of fluid to said cylinder to move said plunger, pressure operated means associated with said lever and operated by the fluid supplied to the machine to hold said plunger in one of its operative positions for a predetermined time, and a needle valve to control the time during which said plunger is held in an operative position.

3. In a fluid operated machine, the combination of a frame, a cylinder thereon, a plunger in said cylinder, an operating lever controlling the admission of fluid to said cylinder to move said plunger, pressure operated means associated with said lever to hold said plunger in one of its operative positions for a predetermined time, and a needle valve adapted to be adjusted to permit variations in time during which the plunger is held in an operative position.

4. In a fluid operated machine, the combination of a frame, a cylinder thereon, a plunger in said cylinder, an operating lever controlling the admission of fluid to said cylinder to move said plunger, pressure operated means associated with said lever and operated by fluid supplied to the machine to hold said plunger in one of its operative positions for a predetermined time, and a needle valve adapted to be adjusted to control the fluid pressure in said means and control the time during which the plunger is held in its operative position.

5. In a fluid operated machine, the combination of a frame, a cylinder thereon, a plunger in said cylinder, an operating lever controlling the admission of fluid to said cylinder to move said plunger, a spring pressed latch adapted to engage said lever and hold it in one of its operative positions, fluid pressure operated means to release said latch, and means to vary the time of releasing said lever.

6. In a fluid operated machine, the combination of a frame, a cylinder thereon, a plunger in said cylinder, an operating lever controlling the admission of fluid to said cylinder to move said plunger, a spring pressed latch adapted to engage said lever and hold it in one of its operative positions, fluid pressure operated means to release said lever, and a needle valve to vary the time of releasing said lever.

7. In a fluid operated machine, the combination of a frame, a cylinder thereon, a plunger in said cylinder, an operating lever controlling the admission of fluid to said cylinder to move said plunger, a spring pressed latch adapted to engage said lever and hold it in one of its operative positions, and fluid pressure operated means to release said lever, said fluid operated means being adjustable to vary the time of releasing said lever.

8. In a fluid operated machine, the combination of a frame, a cylinder thereon, a plunger in said cylinder, an operating lever controlling the admission of fluid to said cylinder to move said plunger, and a bell crank lever one arm of which is adapted to engage said operating lever and the other arm adapted to be engaged by a fluid pressure operated piston to oscillate said bell crank and permit disengagement of said bell crank lever from said operating lever.

9. In a fluid operated machine, the combination of a frame, a cylinder thereon, a plunger in said cylinder, an operating lever controlling the admission of fluid to said cylinder to move said plunger, and a spring pressed bell crank lever one arm of which is adapted to engage said operating lever and the other arm adapted to be engaged by a fluid operated piston to oscillate said bell crank and permit disengagement of said bell crank lever from said operating lever.

10. In a fluid operated machine, the combination of a frame, a cylinder thereon, a plunger in said cylinder, an operating lever controlling the admission of fluid to said cylinder to move said plunger, a bell crank lever one arm of which is adapted to engage said operating lever and the other arm adapted to be engaged by a fluid operated piston to oscillate said bell crank and permit disengagement of said bell crank lever from said operating lever, and means to vary the time of movement of said bell crank.

In testimony whereof, I hereto affix my signature.

WILLIAM J. HAGMAN.